US009452556B2

(12) United States Patent
Tong

(10) Patent No.: US 9,452,556 B2
(45) Date of Patent: Sep. 27, 2016

(54) MOLD CORE FOR MANUFACTURING CONTAINER CLOSURE

(71) Applicant: Chuen Po Tong, Yuen Long (HK)

(72) Inventor: Chuen Po Tong, Yuen Long (HK)

( * ) Notice: Subject to any disclaimer, the term of this patent is extended or adjusted under 35 U.S.C. 154(b) by 0 days.

(21) Appl. No.: 14/751,982

(22) Filed: Jun. 26, 2015

(65) Prior Publication Data

US 2016/0089824 A1  Mar. 31, 2016

(30) Foreign Application Priority Data

Sep. 28, 2014  (CN) .......................... 2014 1 0510159

(51) Int. Cl.
*B29C 33/48* (2006.01)
*B29C 33/76* (2006.01)
*B29C 45/44* (2006.01)
(Continued)

(52) U.S. Cl.
CPC ........... *B29C 45/2618* (2013.01); *B29C 33/04* (2013.01); *B29C 33/44* (2013.01); *B29C 33/485* (2013.01); *B29C 33/76* (2013.01);
(Continued)

(58) Field of Classification Search
CPC .......... B29C 45/2618; B29C 45/4421; B29C 33/04; B29C 33/485; B29C 33/76; B29C 2031/565; B29C 2001/00
See application file for complete search history.

(56) References Cited

U.S. PATENT DOCUMENTS 3,247,548 A * 4/1966 Thorington ........... B29C 33/485
249/142
4,019,711 A * 4/1977 Altenhof ............. B29C 45/4421
249/180

(Continued)

FOREIGN PATENT DOCUMENTS

CN  101890773  11/2010
CN  102529003   7/2012
(Continued)

OTHER PUBLICATIONS

The International Search Report in both English and Chinese and the Written Opinion in Chinese of the corresponding PCT application No. PCT/CN2015/083318, Total 8 pages. Report date Oct. 9, 2015.

(Continued)

*Primary Examiner* — Robert B Davis
(74) *Attorney, Agent, or Firm* — Hamre, Schumann, Mueller & Larson, P.C.

(57) ABSTRACT

The present invention discloses a mold core for manufacturing a container closure comprising a plurality of slides, a sleeve placed over the plurality of slides, a slide seat on which the plurality of slides are mounted, and a cam device arranged inside a space defined by the plurality of slides. The plurality of slides comprise a plurality of first independent slides and a plurality of second independent slides, wherein each of the first independent slides and each of the second independent slides are configured to be individually mounted on and individually detached from the slide seat; and wherein axial movement of the sleeve relative to the first independent slides and the second independent slides effects application of radial force onto the first independent slides and the second independent slides successively, so as to cause successive inward movement of the first independent slides and of the second independent slides within the sleeve. Since the plurality of slides of the present invention comprise a plurality of independent slides, therefore the mold has a simple structure, is easy to maintain and replace, and has low maintenance and replacement costs.

15 Claims, 9 Drawing Sheets

(51) Int. Cl.
  *B29C 45/26*   (2006.01)
  *B29C 33/04*   (2006.01)
  *B29C 33/44*   (2006.01)
  B29L 1/00      (2006.01)
  B29L 31/56     (2006.01)

(52) U.S. Cl.
  CPC ........ B29C45/4421 (2013.01); *B29L 2001/00* (2013.01); *B29L 2031/565* (2013.01)

(56) References Cited

U.S. PATENT DOCUMENTS

| | | | |
|---|---|---|---|
| 4,541,605 A | | 9/1985 | Kubota et al. |
| 4,861,257 A | * | 8/1989 | Siotani .................. B29C 33/485 249/175 |
| 5,403,179 A | | 4/1995 | Ramsey |
| 7,293,341 B2 | | 11/2007 | Zydron |
| 2009/0152770 A1 | * | 6/2009 | Mikac ................. B29C 45/4421 264/334 |
| 2010/0323051 A1 | | 12/2010 | Helenius et al. |

FOREIGN PATENT DOCUMENTS

| | | |
|---|---|---|
| EP | 0630734 | 12/1994 |
| EP | 1179407 | 2/2002 |
| JP | 10557760 | 3/1993 |
| KR | 200441433 | 8/2008 |
| WO | 2008054319 | 5/2008 |

OTHER PUBLICATIONS

The European Search Report of the corresponding European patent application No. 15275163.2, total 9 pages. Report date Feb. 24, 2016.

* cited by examiner

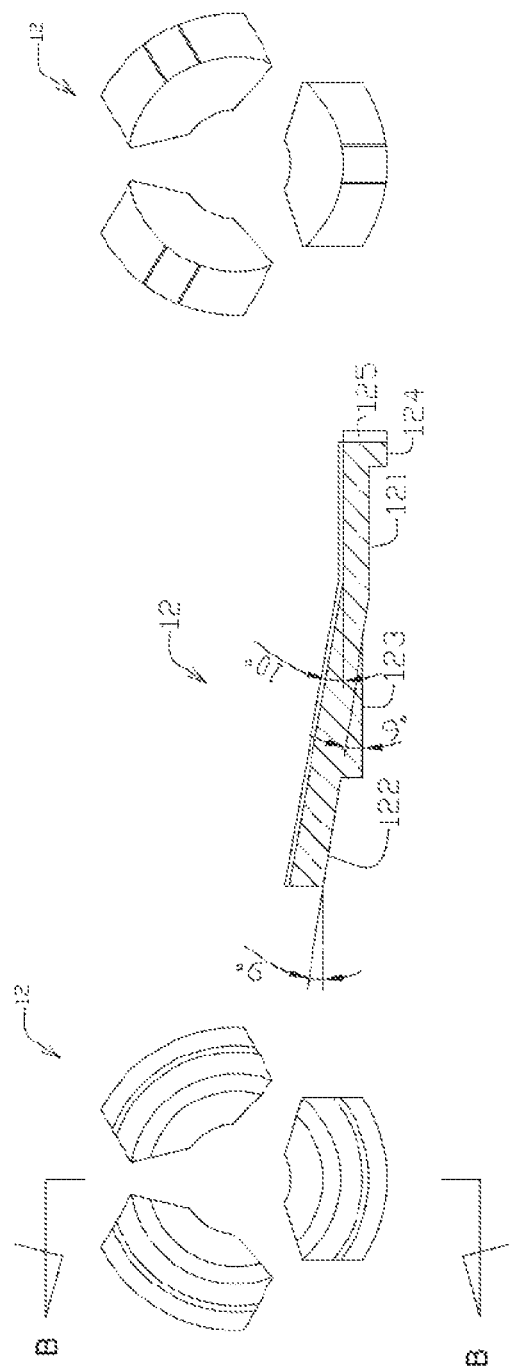

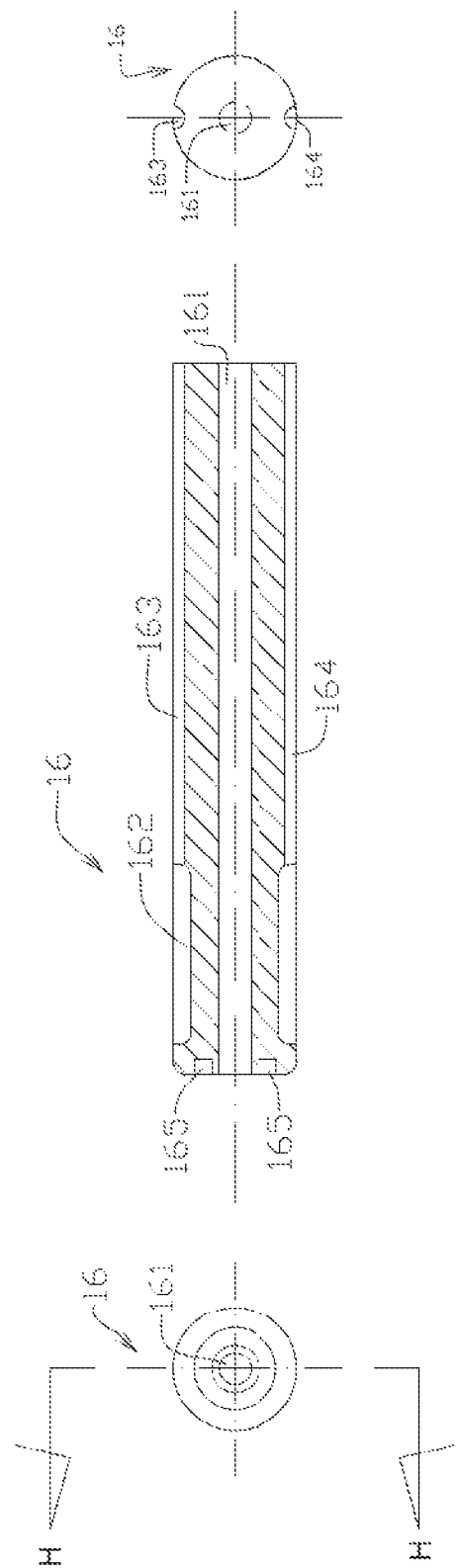

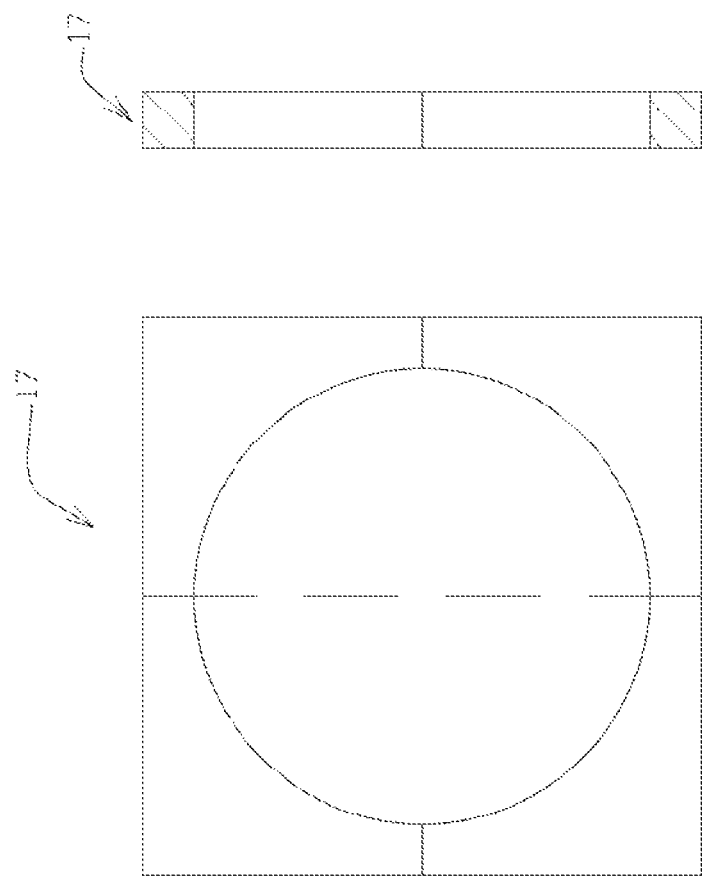

MOLD CORE FOR MANUFACTURING CONTAINER CLOSURE

TECHNICAL FIELD

The invention relates to the field of container closure manufacturing, in particular a mold core for manufacturing a container closure.

TECHNICAL BACKGROUND OF THE INVENTION

Currently, there is a huge demand in the market for a plastic closure with internal threads, which is widely used in daily life and has extremely high daily amount of consumption. However, the plastic closure with internal threads is manufactured through an injection molding machine. Current technologies of manufacturing molds for plastic closures with internal threads must be involved with a component for releasing rotating gears, which needs to be driven by a motor or a turbine to generate power. In addition, the conventional molds are complex in structure and difficult to maintain. Furthermore, most of the molds cannot be equipped with a cooling system, and have a long injection molding cycle.

Therefore, there is a need for an injection mold which is simple in structure, highly practical, easy to maintain and has a short injection molding cycle.

SUMMARY OF THE INVENTION

The object of the present invention is to provide a mold core for manufacturing a container closure, which can overcome problems associated with a mold core, including complex structure, difficulty in maintenance and replacement, and high costs of maintenance and replacement.

To achieve the above object, according to one aspect of the present invention, there is provided a mold core for manufacturing a container closure comprising a plurality of slides, a sleeve placed over the plurality of slides, a slide seat on which the plurality of slides are mounted, and a cam device arranged inside a space defined by the plurality of slides, wherein the plurality of slides comprise a plurality of first independent slides each of which is configured to be individually mounted on and detached from the slide seat, and a plurality of second independent slides each of which is configured to be individually mounted on and detached from the slide seat; and wherein axial movement of the sleeve relative to the first independent slides and the second independent slides effects successive application of a radial force onto the first independent slides and the second independent slides, so as to cause inward movement of the first and second independent slides within the sleeve.

Preferably, the first independent slide has larger dimensions than the second independent slide.

Preferably, in assembly, a plurality of the first independent slides and a plurality of the second independent slides together form a cylinder.

Preferably, the slide seat is provided with large slide slots alternating with small slide slots, all of the slide slots being arranged circumferentially. Each of the first independent slides is provided with a first mounting portion slidably mounted in one of the small slide slots; each of the second independent slides is provided with a second mounting portion slidably mounted in one of the large slide slots.

Preferably, the first independent slides each have a tapered surface on an outer side surface thereof, and the sleeve has a tapered mating portion on an inner wall thereof. The tapered surface of the first independent slide and the tapered mating portion of the sleeve are similarly tapered so that they mate with each other after the sleeve is placed over the plurality of slides, and the axial movement of the sleeve relative to the first independent slides enables the tapered mating portion to apply a radial force onto the first independent slides, thereby causing the inward movement of the first independent slides within the sleeve.

Preferably, a plurality of wedge blocks integral with an inner wall of one end of the sleeve project inwardly and are distributed uniformly and circumferentially, and the first independent slides are provided as camber blocks whose outer surfaces and the wedge blocks are similarly tapered so that the wedge blocks and the first independent slides mate with each other after the sleeve is placed over the plurality of slides, and the axial movement of the sleeve causes radial movement of the first independent slides.

Preferably, the second independent slides each have a cylindrical surface and a tapered surface on an outer side surface thereof, wherein the cylindrical surface is configured to come into contact with a portion of the sleeve between the wedge blocks when the wedge blocks are in contact with the tapered surfaces of the first independent slides; and the tapered surface of the second independent slide is configured to come into contact with the sleeve so that the sleeve applies the radial force onto the second independent slides, thereby causing the inward movement of the second independent slides within the sleeve, after the sleeve moves further to cause the inward movement of the first independent slides.

Preferably, a plurality of first grooves and a plurality of second grooves are arranged alternately at another end of the sleeve, and the slide seat is provided with a through hole. A plurality of large protrusions and a plurality of small protrusions are formed on the inner wall of the through hole. When the sleeve passes through the slide seat, the plurality of large protrusions engage with the plurality of first grooves respectively and the plurality of small protrusions engage with the plurality of second grooves.

Preferably, the mold core further comprises a positioning member consisting of two opposite positioning portions, and a positioning groove in which the two positioning portions are mounted is formed circumferentially on an outer wall at one end of the sleeve, wherein the positioning portions are mounted such that they are able to apply an axial force to the sleeve.

Preferably, the mold core further comprises a cooling assembly mounted within the cam device.

Preferably, the cooling assembly is provided with a neck configured to form a cooling fluid containing chamber together with an inner wall of the cam device, a cooling fluid inflow trough from which the cooling liquid flows into the containing chamber, and a cooling fluid outflow trough where the cooling liquid received in the containing chamber exits.

Preferably, the cooling assembly has a sealing groove formed at an end face thereof and adapted for installation of a sealing ring to create a seal for the containing chamber where the cooling fluid is contained.

Preferably, the cam device is configured to have a tapered front end portion and an internal cavity for accommodating the cooling assembly.

Preferably, the cam device is configured to have a tapered front end portion, and the first independent slides each have outer and inner side surfaces which are provided to have different tapers, wherein the outer surface of the first independent slide and a plurality of wedge blocks formed integral with an inner wall of one end of the sleeve are similarly tapered at a taper angle in a range of 7-12 degrees, and the inner surface of the first independent slide and the tapered front end portion of the cam device are similarly tapered at a taper angle in a range of 8-13 degrees, and wherein the taper angle of the outer surface of the first independent slide is less than that of the inner surface of the first independent slide.

Preferably, the taper angle of the outer surface of the first independent slide is 9 degrees, and the taper angle of the inner surface of the first independent slide is 10 degrees. Preferably, the mold core further comprises a top pin, and both the cooling assembly and the cam device are each provided with a top pin hole. When the cooling assembly is mounted within the cam device, the top pin hole of the cooling assembly and that of the cam device align to accommodate the pin together.

According to another aspect of the present invention, there is provided a mold core for manufacturing a container closure comprising a plurality of slides, a sleeve placed over the plurality of slides, a slide seat on which the plurality of slides are mounted, a cam device arranged inside a space defined by the plurality of slides, a cooling assembly mounted within the cam device, and a positioning member, wherein the plurality of slides comprise a plurality of first independent slides and a plurality of second independent slide; wherein the slide seat is provided with a plurality of large slide slots alternating with a plurality of small slide slots, all of the slide slots being arranged circumferentially; each of the first independent slides has a first mounting portion slidably mounted in one of the small slide slots, and each of the second independent slides has a second mounting portion slidably mounted in one of the large slide slots; wherein a plurality of wedge blocks integral with an inner wall of one end of the sleeve project inwardly and are distributed uniformly and circumferentially, and the first independent slides are provided as camber blocks whose outer surfaces and the wedge blocks are similarly tapered so that the wedge blocks and the first independent slides mate with each other after the sleeve is placed over the plurality of slides, and an axial movement of the sleeve effects application of a radial force onto the first independent slides, so as to cause inward movement of the first independent slides within the sleeve; the second independent slides each have a cylindrical surface and a tapered surface on an outer side surface thereof, wherein the cylindrical surface is configured to come into contact with a portion of the sleeve between the wedge blocks when the wedge blocks are in contact with tapered surfaces of the first independent slides; and the tapered surface of the second independent slide is configured to come into contact with the sleeve so that the sleeve applies a radial force onto the second independent slides, thereby causing inward movement of the second independent slides within the sleeve, after the sleeve moves further to cause the inward movement of the first independent slides; and wherein a plurality of first grooves and a plurality of second grooves are arranged alternately at another end of the sleeve, and the slide seat is provided with a through hole, and wherein a plurality of large protrusions respectively engageable with the plurality of first grooves and a plurality of small protrusions respectively engageable with the plurality of second grooves, when the sleeve passes through the slide seat, are formed on an inner wall of the through hole.

According to another aspect of the present invention, there is provided a mold core for manufacturing a container closure, comprising a plurality of slides, a sleeve placed over the plurality of slides, a slide seat on which the plurality of slides are mounted, and a cam device arranged inside a space defined by the plurality of slides, wherein the plurality of slides comprise a plurality of first independent slides and a plurality of second independent slide; wherein the slide seat is provided with a plurality of large slide slots alternating with a plurality of small slide slots, all of the slide slots being arranged circumferentially; wherein each of the first independent slides has a first mounting portion slidably mounted in one of the small slide slots, and each of the second independent slides has a second mounting portion slidably mounted in one of the large slide slots; and wherein the first mounting portions are sized differently from each other, and the small slide slots are correspondingly sized differently from each other to mate with the respective first mounting portions; and the second mounting portions are sized differently from each other, and the large slide slots are correspondingly sized differently from each other to mate with the respective second mounting portions.

BRIEF DESCRIPTION OF DRAWINGS

FIG. 3b is a cross-sectional view taken along plane A-A in FIG. 3a.

FIG. 4a is a right view of a large independent slide according to the present invention.

FIG. 4b is a cross-sectional view taken along the plane B-B in FIG. 4a.

FIG. 4c is a left view of a large independent slide according to the present invention.

FIG. 5b is a cross-sectional view taken along plane C-C in FIG. 5a.

FIG. 5d is a cross-sectional view taken along plane D-D in FIG. 5a.

FIG. 6b is a cross-sectional view taken along plane E-E in FIG. 6a.

FIG. 6d is a cross-sectional view taken along plane F-F in FIG. 6a.

FIG. 7b is a cross-sectional view taken along plane G-G in FIG. 7a.

FIG. 8a is a right view of a cooling assembly according to the present invention.

FIG. 8b is a cross-sectional view taken along plane H-H in FIG. 8a.

FIG. 8c is a left view of the cooling assembly according to the present invention.

FIG. 9a is a left view of a positioning member according to the present invention.

FIG. 9b is a cross-sectional view of the positioning member according to the present invention.

DETAILED DESCRIPTION OF EMBODIMENTS

Figure 1:
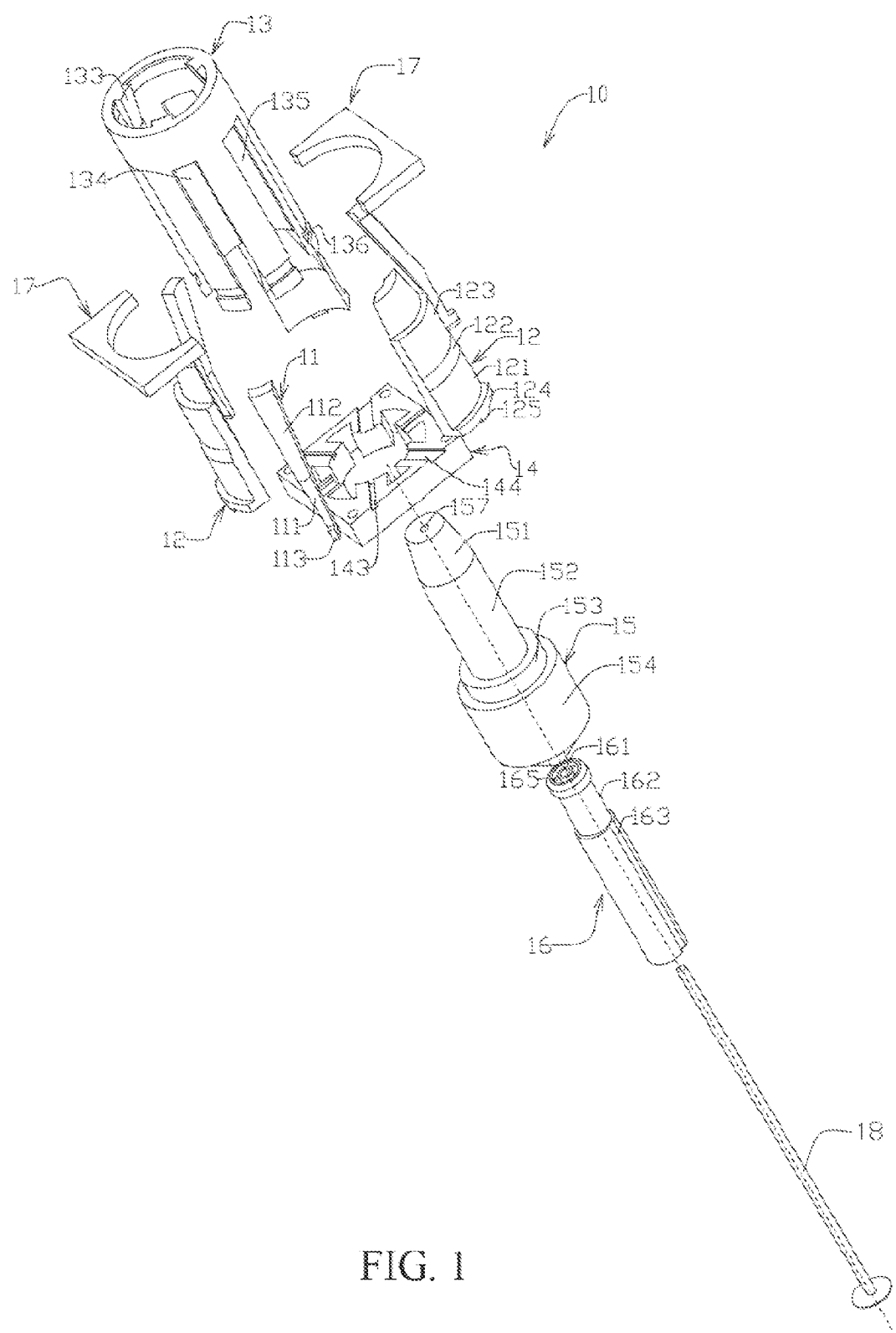
FIG. 1 is a perspective exploded view of a mold core according to the present invention.

The preferred embodiments of the invention will be described below in detail with the reference to the drawings so as to more clearly understand the purpose, features and advantages of the present invention. It should be understood that the embodiments shown in the drawings shall not be construed as limiting the scope of the invention, but merely serve to illustrate the substantive spirit of the technical solution of the present invention.

Figure 2:
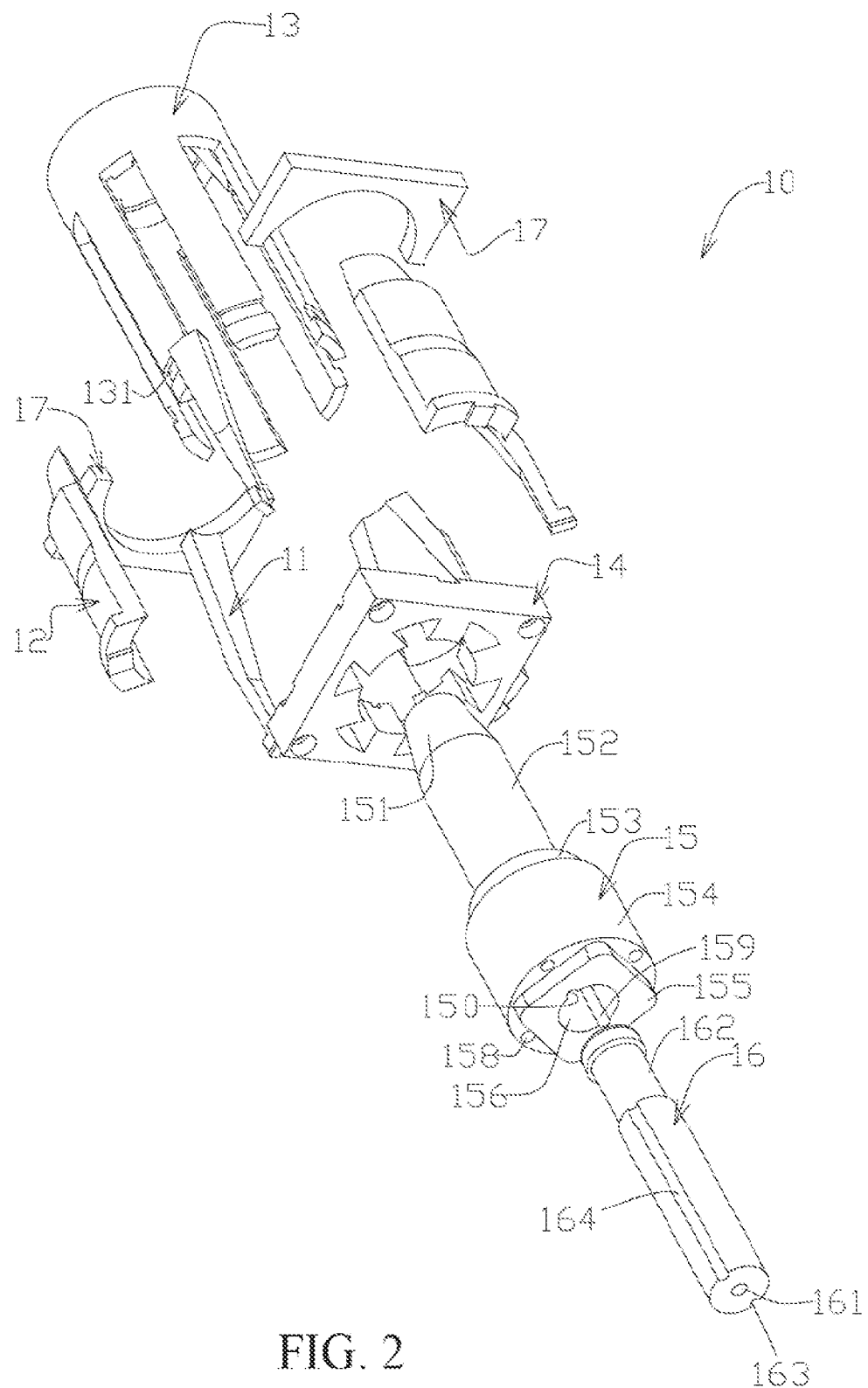
FIG. 2 is another perspective exploded view of a mold core according to the present invention.
Figure 3C:
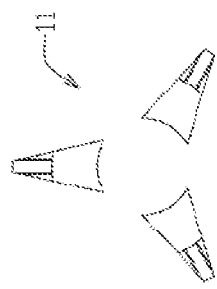
FIG. 3c is a left view of a small independent slide according to the present invention.
Figure 3B:
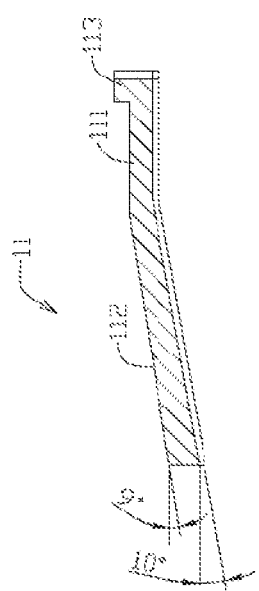
Figure 3A:
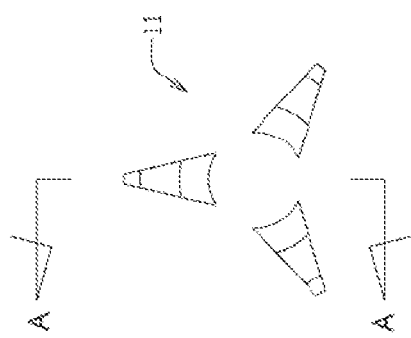
FIG. 3a is a right view of a small independent slide according to the present invention.
Figure 5D:
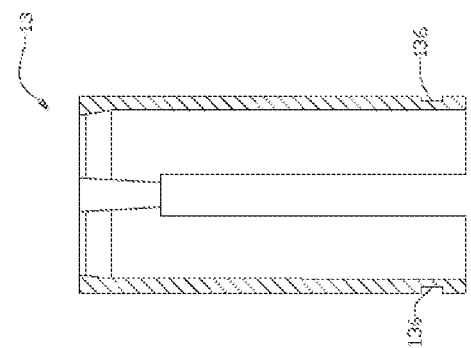
Figure 5C:
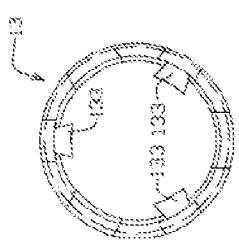
FIG. 5c is a left view of a large independent slide according to the present invention.
Figure 5B:
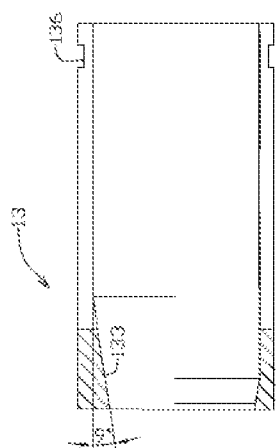
Figure 5A:
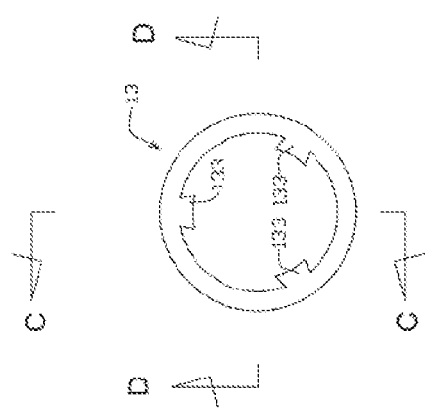
FIG. 5a is a right view of a sleeve according to the present invention.
Figure 6D:
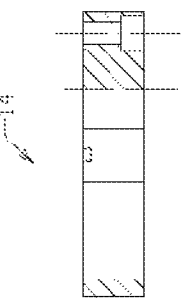
Figure 6C:
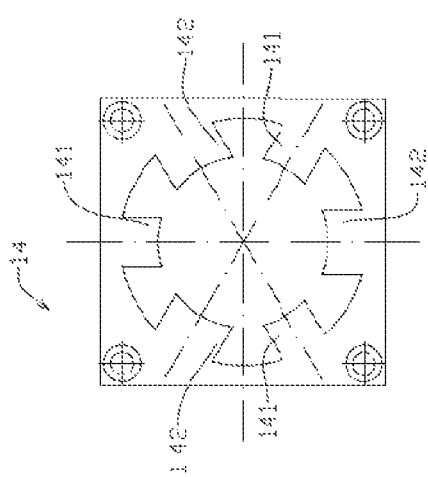
FIG. 6c is a left view of a sleeve according to the present invention.
Figure 6B:
Figure 6A:
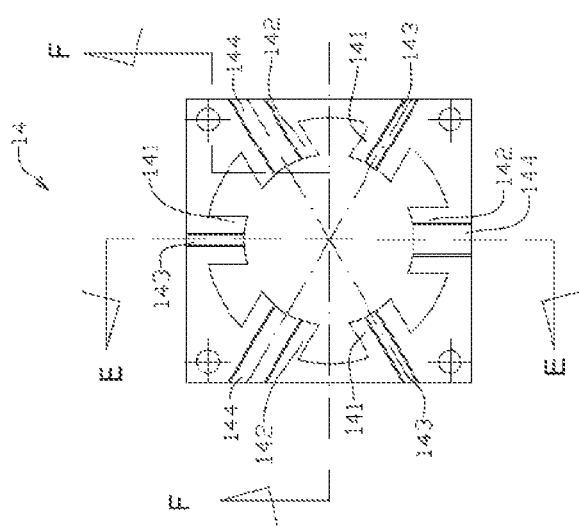
FIG. 6a is a right view of a slide seat according to the present invention.

As shown in FIG. 1 and FIG. 2, there is illustrated a mold core 10 for manufacturing a container closure according to the present invention, which comprises three small independent slides 11, three large independent slides 12, a sleeve 13, a slide seat 14, a cam device 15, a cooling assembly 16, and a positioning member 17.

The small independent slides 11 and the large independent slides 12 are mounted slidably on the slide seat 14 so that the small independent slides 11, the large independent slides 12 and the slide seat 14 together form a conical cavity. The sleeve 13 is placed over the outside of the conical cavity formed by the small independent slides 11 and the large independent slides 12. The cam device 15 is arranged inside the conical cavity formed by the small independent slides 11 and the large independent slides 12.

The cam device 15 is provided with a large cooling hole 156 and a small top pin hole 157 therein. The large cooling hole 156 is located at the middle and rear portions of the cam device 15 and has a large diameter. The small top pin hole 157 is located at the front portion of the cam device 15 and has a small diameter. The large cooling hole 156 is in fluid communication with the small top pin hole 157. A cooling assembly 16 is disposed within the cooling hole 156. A through hole 161 is provided within the cooling assembly 16. When the cooling assembly 16 is mounted within the cam device 15, the through hole 161 and the small top pin hole 157 align, and a top pin 18 is mounted in a manner that the pin runs through the through hole 161 and the small top pin hole 157.

The outer periphery of the sleeve 13 is provided with a positioning groove 131. The positioning member 17 is mounted in the positioning groove 131. A sealing groove 165 is formed in a front end portion of the cooling assembly 16 for receiving a waterproof ring so as to prevent cooling liquid from escaping from the front end portion of the cooling assembly 16.

As shown in FIG. 1-FIG. 3c, the small independent slide 11 is provided as a camber block comprising two portions: a first portion 111 and a second portion 112. The first portion 111 is a columnar body whose inner and outer side surfaces are both cambered. The second portion 112 is inclined inward relative to the first portion 111 and therefore has a certain taper. The first portion 111 of the small independent slide 11 is terminated by a first mounting portion 113, which cooperates with a corresponding small slide slot 143 on the slide seat 14, so that the small independent slide 11 is mounted on the slide seat 14 by mounting the first mounting portion 113 in the small slide slot 143. In this embodiment, the cross-section of the first mounting portion 113 is dovetail-shaped, and the cross-section of the small slide slot 143 is also dovetail-shaped correspondingly; therefore, after the first mounting portion 113 is mounted in the small slide slot 143, the small independent slide 11 can only slide in the small slide slot 143 in the slide seat 14. This ensures that, after having been mounted on the slide seat 14, the small independent slide 11 can only move radially relative to the slide seat 14 and is prevented from moving axially (i.e. cannot move up and down), and therefore the small independent slide 11 will not move out of the small slide slot 143 in the axial direction of the sleeve 13.

The person skilled in the art would appreciate that the cross-sections of the first mounting portion 113 and of the small slide slot 143 can also have other shapes. For instance, the cross-sections of the mounting portion and the small slide slot may be both in an inverse T-shape.

In this embodiment, the second portion of the small independent slide 11 has a taper angle of about 9 degrees, so as to mate with the wedge block 133 on the inner wall of the sleeve, thereby the axial movement of the sleeve 13 can drive the small independent slide 11 to move radially, which will be further described below. The person skilled in the art would appreciate that this taper angle can be of other suitable angles, such as 7-12 degrees.

As shown in FIG. 1, FIG. 2 and FIGS. 4a-4c, the large independent slide 12 is also provided as a camber block comprising three portions: a first portion 121, a second portion 122 and a third portion 123. The first portion 121 is a columnar body whose inner and outer side surfaces are both cambered. The second portion 122 is inclined inward relative to the first portion 121 and therefore has a certain taper. The third portion 123 extends from an outer end of the second portion 122. The outer side surface of the third portion 123 is cambered, and the cambered outer side surface of the third portion 123 is parallel to the cambered outer side surface of the first portion 121. The cambered outer side surface of the third portion 123 has a diameter smaller than that of the cambered outer side surface of the first portion 121. In this embodiment, the outer surface of the second portion 122 has a taper angle of about 9 degrees. Accordingly, the inner surface of the sleeve has a taper angle of about 9 degrees. The person skilled in the art would appreciate that the taper of the outer surface of the second portion 123 can be of other suitable angles, such as 7-12 degrees.

At an end surface of the first portion 121 is positioned a flange 124 on which a second mounting portion 125 is mounted. A large slide slot 144 is positioned in the slide seat 14 to correspond to the second mounting portion 125, so that the large independent slide 12 can be mounted on the slide seat 14 by mounting the second mounting portion 125 in the large slide slot 144.

In this embodiment, the cross-section of the second mounting portion 125 is dovetail-shaped, and the cross-section of the large slide slot 144 on the slide seat 14 is also dovetail-shaped accordingly. This ensures that, after having been mounted in the large slide slot 144, the second mounting portion 125 can only move within the large slide slot 144 and is prevented from moving out of the slide seat 14.

The person skilled in the art would appreciate that the cross-sections of the second mounting portion 125 and the large slide slot 144 can also have other shapes, such as an inverse T-shape, with which the object of the present invention can also be achieved.

As shown in FIG. 1, FIG. 2 and FIGS. 5a-5d, the sleeve 13 is a substantially cylindrical sleeve. At one end (the left end of FIG. 5b) of the sleeve 13, three wedge blocks 133 integral with an inner wall of this end project inwardly at equal angular intervals in a spaced-apart fashion. Each of the wedge blocks 133 has one thicker end (the left end of FIG. 5b) in alignment with one end of the sleeve 13.

In this preferred embodiment, as shown in FIGS. 5a-5d, an inner surface of the wedge block 133 is arranged relative to the outer side surface of the sleeve 13 at an angle of about 9 degrees, which angle is the same as the taper angle of the outer side surface of the small independent slide 11, so that the axial movement of the sleeve 13 can apply a radial force to the small independent slides 11.

The other end of the sleeve 13 is provided with six open grooves. These six open grooves comprise first grooves 134 having a smaller width and second grooves 135 having a larger width. Each of the first grooves 134 is aligned with and adjoins each of the wedge blocks 133, and each of the second grooves 135 is located just between two adjacent first grooves 134. The second groove 135 and the first groove have the same length, and both extend from the other end of the sleeve 13 to the other end of the wedge block 133. The other end of the sleeve 13 is further provided with a positioning groove 136 for mounting the positioning member 17.

As shown in FIG. 1, FIG. 2 and FIGS. 6a-6c, the slide seat 14 is a cubic block. At the center of the cubic block, a circular through hole is opened. Six protrusions integral with an inner wall of the circular through hole project inwardly from said inner wall. The six protrusions comprise three small protrusions 141 of the same configuration and size arranged at equal intervals and three large protrusions 142 of the same configuration and size arranged at equal intervals, thereby alternating one large protrusion 142 with one small protrusion 141.

As shown in FIG. 1, FIG. 2 and FIGS. 6a-6c, each two adjacent small protrusions 141 of the three small protrusions 141 are arranged relative to each other at an angle of 120 degrees, and each two adjacent large protrusions 142 of the three large protrusions 142 are also arranged relative to each other at an angle of 120 degrees. The small protrusion 141 and the first groove 134 of the sleeve 13 are of the same width. The large protrusion 142 and the second groove 135 of the sleeve 13 are of the same width. The small protrusions 141 are configured to be received in the respective first grooves 134, and the large protrusions 142 are configured to be received in the respective second grooves 135, when the sleeve 13 passes through the slide seat 14.

As shown in FIG. 1, FIG. 2 and FIGS. 6a-6c, a large slide slot 144 adapted for the large independent slide 12 is formed on an end face of each large protrusion 142, in which the second mounting portion 125 of the large independent slide 12 is received for securing the large independent slide 12 on the slide seat 14.

A small slide slot 143 adapted for the small independent slide 11 is formed on an end face of each small protrusion 141, in which the first mounting portion 113 of the small independent slide 11 is received for securing the small independent slide 11 on the slide seat 14. All large independent slides 12 and all small independent slides 11, when they are held in place on the slide seat 14, together form a cone with the uniform distribution of the small and large slides.

Since the slides are mounted on the slide seat 14 independently of one another, it becomes easy and convenient for maintenance and replacement when one of them is out of order. Also since the slides are in operation independently of one another, only the slide that is out of order has to be detached individually for maintenance or replacement. Therefore, the costs associated with maintenance and replacement can be significantly reduced.

Figure 7C:
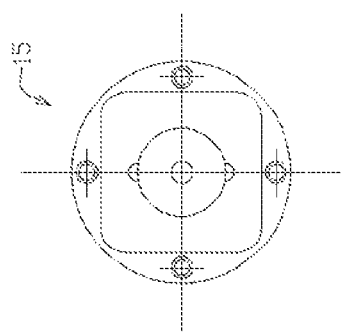
FIG. 7c is a left view of the cam device according to the present invention.
Figure 7B:
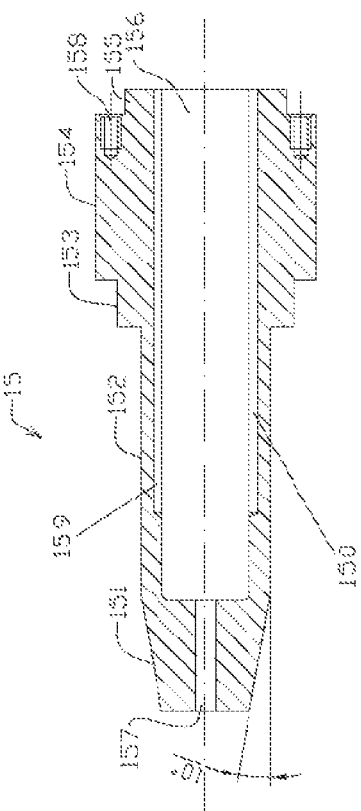
Figure 7A:
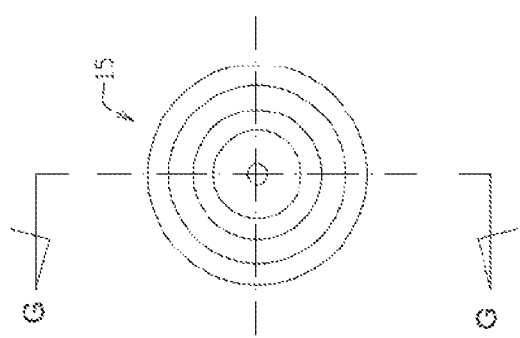
FIG. 7a is a right view of a cam device according to the present invention.

As shown in FIG. 1, FIG. 2 and FIGS. 7a-7c, the cam device 15 comprises four portions from left to right shown in FIG. 7b: a first portion 151 of conical shape, a second portion 152 of cylindrical shape, a third portion 153 of cylindrical shape and fourth portion 154 of cylindrical shape, wherein the latter three portions 152, 153, 154 are of different diameters. The second portion 152 adjacent to the first portion 151 has the smallest diameter. The third portion 153 is located at the middle section of the cam device 15 and has a medium-sized diameter. The fourth portion 154 is located at the end section of the cam device 15 and has the largest diameter. The fourth portion 154 is terminated by a cubic stub 155.

The cooling hole 156 for accommodating the cooling assembly 16 is configured to run through the second portion 152, the third portion 153 and the fourth portion 154 of the cam device 15. The top pin hole 157 for accommodating the pin is provided within the first portion 151. The cooling hole 156 is in fluid communication with the top pin hole 157. The cooling hole 156 has a diameter larger than that of the top pin hole 157. Four threaded holes 158 for connecting to a molding template are uniformly distributed on the end face of the cubic stub 155.

As shown in FIG. 1, FIG. 2 and FIGS. 8a-8c, the cooling assembly 16 is cylindrical and has a through hole 161 formed therethrough. After the cooling assembly 16 and the cam device 15 are assembled together, the through hole 161 of the cooling assembly 16 and the top pin hole 157 of the first portion of the cam device 15 would be centered to align and have the same inner diameter. The through hole 161 and the top pin hole 157 are used to accommodate the pin together.

The cooling assembly 16 has a neck 162 formed on an outer wall of a front portion thereof. After the cooling assembly 16 and the cam device 15 are assembled together, the neck 162 and an inner wall of the cooling hole 156 of the cam device 15 define an enclosed space for containing cooling fluid. Grooves 163 and 164, which are formed on an outer wall of the rear end portion of the cooling assembly 16 (the right side of FIG. 8b), are provided for inflow and outflow of the cooling liquid and therefore can also be referred to as "cooling liquid inflow trough" and "cooling liquid outflow trough" respectively, and are in fluid communication with the neck 162. Accordingly, grooves 159 and 150 for inflow and outflow of the cooling liquid are provided on the inner wall of the cooling hole 156, so that when the cooling assembly 16 is mounted within the cam device 15, the grooves 163 and 164 mate with the grooves 159 and 150 respectively, and are in fluid communication with the enclosed space formed by the neck 162 and the inner wall of the cooling hole 156 of the cam device 15.

The cooling fluid flows from a channel formed by the grooves 163 and 159 or by the grooves 164 and 150 into the enclosed space formed by the neck 162 and the inner wall of the cooling hole 156 of the cam device 15, then exits from a channel formed by the grooves 164 and 150 or by the grooves 163 and 159, to provide the function of cooling a container closure being molded.

The cooling assembly 16 has a sealing groove 165 in the end face of the front end portion thereof for accommodating a waterproof ring so as to prevent the cooling fluid from escaping from the front end portion of the cooling assembly 16.

As shown in FIG. 1, FIG. 2 and FIGS. 9a-9b, the positioning member 17 consists of two halves which are combined to form a structural element which has a rectangular outer perimeter and a circular hole at a center thereof viewed in a cross-section. The thickness of the positioning member 17 is equal to the width of the positioning groove 136 of the sleeve 13, so that the positioning member 17 can be snapped into the positioning groove 136 and is driven to move, thereby causing axial movement of the sleeve 13, which in turn causes the small independent slides 11 and the large independent slides to move radially.

It would be understood that a suitable mold core should be selected properly according to the dimensions of the container closure to be manufactured at the very beginning, namely, various components of the mold core including the small independent slides 11, the large independent slides 12, the sleeve 13, the slide seat 14, the cam device 15, the cooling assembly 16 and the positioning member 17 are selected properly to cater for the container enclosure. Then, the small independent slides 11 and the large independent slides 12 are held on the slide seat 14 by mounting the first mounting portions 113 and the second mounting portions 125 in the small slide slots 143 and the large slide slots 144 formed on the slide seat 14 respectively. The small independent slides 11, the large independent slides 12 and the slide seat 14 together form a conical cavity having one end in connection with the slide seat 14. The cam device 15 is mounted within the conical cavity. The cooling assembly 16 is mounted within the cooling hole 156 in the interior of the cam device, and the waterproof ring is placed in the sealing groove 165 on the end face of the front end portion of the cam device.

The front end portion of the conical cavity (defined by the inner surfaces of the small and large independent slides) and the front end portion of the cam device are configured to have the same taper angle which is about 10 degrees in this preferred embodiment. However, the person skilled in the art would appreciate that this taper angle can be of other values, such as 8-13 degrees. It shall be ensured that the front end portion of the conical cavity and the front end portion of the cam device have the same taper angle which is greater than the taper angle of the outer side surface of the small independent slide by a certain degree in the range of preferably 0.5-2.5 degrees and more preferably 1 or 2 degrees. Thus the cam device 15 can be snugly fitted into the conical cavity. The person skilled in the art would appreciate that the taper angle of the conical cavity formed by the small independent slides 11 and the large independent slides 12 shall vary depending on the taper angle of the inner surfaces of the small and large independent slides, and the taper angle of the front end portion of the cam device be varied to conform to the taper angle of the conical cavity.

The sleeve 13 is sleeved over the conical cavity, and passes through the slide seat 14 to reach and be in alignment with the rear end portion of the cam device 15, where the small protrusions 141 on the slide seat 14 are received in the first grooves 134 of the sleeve 13, and the large protrusions 142 on the slide seat 14 are received in the second grooves 135 of the sleeve 13. The front end portions of the small independent slides 11 and large independent slides 12 extend into the interior of the mold for the container closure. One end of the sleeve 13 and the front end of the third portion 123 of the large independent slide 12 align. In this preferred embodiment, when the sleeve 13 is sleeved over the conical cavity formed by the small and large independent slides, the wedge blocks 133 projecting from the inner wall of the sleeve 13 are snugly positioned on and in close contact with the respective outer side surfaces of the small independent slides 11, because the taper angle of the front end portion of the outer side surface of the small independent slide 11 is configured to have about 9 degrees. The outer side surfaces of the third portions 123 of the large independent slides 12 are in contact with the portions inside the sleeve 13 partitioned by the wedge blocks 133. The positioning member 17 is mounted in the positioning grooves 136 formed on the outer wall of the sleeve 13 and can be driven to move, thereby causing radial movement of the sleeve.

In this preferred embodiment, since the inner side surfaces of the small independent slides 11 and of the large independent slides 12 are all configured to have a taper angle of about 10 degrees at the front end portion thereof, and the conical portion of the cam device 15 is also configured to have a taper angle of about 10 degrees to allow the cam device 15 to be accommodated in the conical cavity formed by the small independent slides 11 and the large independent slides 12. After the sleeve 13, the small independent slides 11, the large independent slides 12 and the cam device 15 are assembled together in place, these various components are in close contact with one another because the wedge blocks 133 formed at the front end portion of the sleeve 13 and the front end portions of the outer side surface of the small independent slides 11 are tapered similarly, and the outer side surface of the cam device 15 and the front end portions of the inner side surfaces of the small and large independent slides 11, 12 are tapered similarly.

After the molding step of the container closure is completed, the cooling fluid is introduced into the cooling assembly 16 by adding the cooling fluid into the groove 163 or 164 and allowing the cooling fluid to flow into the enclosed space formed by the neck 162 of the cooling assembly 16 and the inner walls of the cooling hole 156 of the cam device 15. The container closure is cooled down by the cooling fluid contained in the enclosed space, then the cooling fluid exits through the groove 164 or 163.

At the end of the molding step of the container closure, the positioning member 17 is driven by a drive device (not shown) to move backward, which in turns causes backward movement of the sleeve 13 in the axial direction. Because the wedge blocks 133 inside the sleeve 13 and the outer side surface of the small independent slides 11 have the same taper angle (which is 9 degrees in this embodiment), such an axial movement of the sleeve 13 effects application of a radial force onto the small independent slides 11, thereby forcing the small independent slides 11 to move inwards within the sleeve.

The first mounting portions of the small independent slides 11 are slidably received in the respective small slide slots 143 formed on the slide seat 14, accordingly the small independent slides 11 are allowed to move in the small slide slots 143. This enables the small independent slides 11 on which the radial force of the sleeve 13 acts can slide inward within the sleeve and are disengaged from the container closure.

After the positioning member 17 moves further, the inner side surface of the sleeve 13 comes into contact with the outer side surfaces of the second portions of the second independent slides 12, so that the sleeve 13 applies a radial force onto the large independent slides 12 which are then caused to slide inward. The second mounting portions 125 of the large independent slides 12 are slidably received in the large slide slots 144 formed on the slide seat 14, accordingly, the large independent slides 12, when being subject to the radial force applied by the sleeve, are allowed to slide inward within the sleeve in the large slide slots 144 and are disengaged from the container closure. After the disengagement of the large second independent slides 12, the pin 18 is actuated to drive the container closure to move forward, thereby allowing the release of both the small independent slides 11 and the large independent slides 12 from the mold for manufacturing the container closure.

If the second molding processing is required, the mold would be driven to move to the front end of the conical cavity formed by the large independent slides 12 and the small independent slides 11, then the cam device 15 and the cooling assembly 16 are driven to move forward by the driving device until the tapered surface 151 of the first portion of the cam device 15 applies a radial force onto the inner side surfaces of the large and small independent slides 12, 11, thereby forcing both the large and small independent slides 12, 11 to slide in the large slide slots 144 and the small slide slots 143 respectively and move away from the sleeve. At that time, since no driving force is applied onto the sleeve 13, the sleeve 13, the large independent slides 12 and the small independent slides 11 all resume to their respective ready-to-use positions.

In this embodiment, the first mounting portions of all the small independent slides are of the same dimensions and the second mounting portions of all the large independent slides are of the same dimensions. It would be within the ability of the person skilled in the art that the first mounting portions of the small independent slide can be configured to be sized differently from each other and the small slide slots formed on the slide seat are sized differently accordingly. Likewise, the second mounting portions of the large independent slides can be configured to be sized differently from each other and the large slide slots formed on the slide seat are sized differently accordingly. The configuration of different sizes for the first mounting portions and second mounting portions would ensure that each small independent slide and each large independent slide are correctly mounted on the slide seat.

The present invention allows for processing the outer walls of the individual small and large independent slides to provide a variety of shapes and threads thereon, enabling formation of the corresponding shapes and threads on the inner wall of the container closure.

All slides of the present invention operate independently of one another, which provides the ease of mounting, dismantling and maintenance of the slides. Therefore, the cost of maintaining and replacing the mold core can be significantly reduced.

In addition, the cooling system incorporated in the mold core of the invention can simplify the mold of the container closure in terms of structure and also reduce space required for the manufacturing of container enclosures.

The term "small independent slide" herein is also called a first independent slide, which firstly disengages from a container closure after the completion of the molding step. The term "large independent slide" herein is also called a second independent slide, which disengages from a container closure following the disengagement of the small independent slide from the container closure. The small independent slide or the first independent slide is generally of small size, and the large independent slide or the second independent slide is generally of large size in the present invention.

All publications mentioned herein are incorporated by reference as if each publication is cited alone as a reference within this document. It should also be understood that, after reading the above teachings of the present invention, those skilled in the art may make various modifications or changes to the present invention, and these equivalents fall within the scope defined in the appended claims of the present application.

What is claimed is:

1. A mold core for manufacturing a container closure, comprising a plurality of slides, a sleeve placed over the plurality of slides, a slide seat on which the plurality of slides are mounted, and a cam device arranged inside a space defined by the plurality of slides,
    wherein the plurality of slides comprise a plurality of first independent slides each of which is configured to be individually mounted on and detached from the slide seat, and a plurality of second independent slides each of which is configured to be individually mounted on and detached from the slide seat; and
    wherein axial movement of the sleeve relative to the first independent slides and the second independent slides effects successive application of a radial force onto the first independent slides and the second independent slides, so as to cause inward movement of the first and second independent slides within the sleeve.

2. The mold core according to claim 1, wherein the slide seat is provided with a plurality of large slide slots alternating with a plurality of small slide slots, all of the slide slots being arranged circumferentially; each of the first independent slides has a first mounting portion slidably mounted in one of the small slide slots, and each of the second independent slides has a second mounting portion slidably mounted in one of the large slide slots.

3. The mold core according to claim 1, wherein the first independent slides each have a tapered surface on an outer side surface thereof, and the sleeve has a tapered mating portion on an inner wall thereof, and wherein the tapered surface of the first independent slide and the tapered mating portion of the sleeve are similarly tapered so that they mate with each other after the sleeve is placed over the plurality of slides, and the axial movement of the sleeve relative to the first independent slides enables the tapered mating portion to apply the radial force onto the first independent slides, thereby causing the inward movement of the first independent slides within the sleeve.

4. The mold core according to claim 1, wherein a plurality of wedge blocks integral with an inner wall of one end of the sleeve project inwardly and are distributed uniformly and circumferentially, and the first independent slides are provided as camber blocks whose outer surfaces and the wedge blocks are similarly tapered so that the wedge blocks and the first independent slides mate with each other after the sleeve is placed over the plurality of slides, and the axial movement of the sleeve causes radial movement of the first independent slides.

5. The mold core according to claim 4, wherein the second independent slides each has a cylindrical surface and a tapered surface on an outer side surface thereof, wherein the cylindrical surface is configured to come into contact with a portion of the sleeve between the wedge blocks when the wedge blocks are in contact with the tapered surfaces of the first independent slides; and the tapered surface of the second independent slide is configured to come into contact with the sleeve so that the sleeve applies the radial force onto the second independent slides, thereby causing the inward movement of the second independent slides within the sleeve, after the sleeve moves further to cause the inward movement of the first independent slides.

6. The mold core according to claim 4, wherein a plurality of first grooves and a plurality of second grooves are arranged alternately at another end of the sleeve, and the slide seat is provided with a through hole, and wherein a plurality of large protrusions respectively engageable with the plurality of first grooves and a plurality of small protrusions respectively engageable with the plurality of second grooves, when the sleeve passes through the slide seat, are formed on an inner wall of the through hole.

7. The mold core according to claim 1, wherein the mold core further comprises a positioning member consisting of two opposite positioning portions, and a positioning groove in which the two positioning portions are mounted is formed circumferentially on an outer wall at one end of the sleeve, wherein the positioning portions are mounted such that they are able to apply an axial force to the sleeve.

8. The mold core according to claim 1, wherein the mold core further comprises a cooling assembly mounted within the cam device.

9. The mold core according to claim 8, wherein the cooling assembly is provided with a neck configured to form a cooling fluid containing chamber together with an inner wall of the cam device, a cooling fluid inflow trough from which the cooling liquid flows into the containing chamber, and a cooling fluid outflow trough where the cooling liquid received in the containing chamber exits.

10. The mold core according to claim 9, wherein the cooling assembly has a sealing groove formed at an end face thereof and adapted for installation of a sealing ring to create a seal for the containing chamber where the cooling fluid is contained.

11. The mold core according to claim 9, wherein the cam device is configured to have a tapered front end portion and an internal cavity for accommodating the cooling assembly.

12. The mold core according to claim 1, wherein the cam device is configured to have a tapered front end portion, and the first independent slides each has outer and inner side surfaces which are provided to have different tapers, wherein the outer surface of the first independent slide and a plurality of wedge blocks formed integral with an inner wall of one end of the sleeve are similarly tapered at a taper angle in a range of 7-12 degrees, and the inner surface of the first independent slide and the tapered front end portion of the cam device are similarly tapered at a taper angle in a range of 8-13 degrees, and wherein the taper angle of the outer surface of the first independent slide is less than that of the inner surface of the first independent slide.

13. The mold core according to claim 9, wherein the mold core further comprises a pin, and both the cooling assembly and the cam device are each provided with a top pin hole, the top pin hole of the cooling assembly and the top pin hole of the cam device align to accommodate the pin together.

14. A mold core for manufacturing a container closure, comprising a plurality of slides, a sleeve placed over the plurality of slides, a slide seat on which the plurality of slides are mounted, a cam device arranged inside a space defined by the plurality of slides, a cooling assembly mounted within the cam device, and a positioning member,
wherein the plurality of slides comprise a plurality of first independent slides and a plurality of second independent slides;
wherein the slide seat is provided with a plurality of large slide slots alternating with a plurality of small slide slots, all of the slide slots being arranged circumferentially;
each of the first independent slides has a first mounting portion slidably mounted in one of the small slide slots, and each of the second independent slides has a second mounting portion slidably mounted in one of the large slide slots;

wherein a plurality of wedge blocks integral with an inner wall of one end of the sleeve project inwardly and are distributed uniformly and circumferentially, and the first independent slides are provided as camber blocks whose outer surfaces and the wedge blocks are similarly tapered so that the wedge blocks and the first independent slides mate with each other after the sleeve is placed over the plurality of slides, and an axial movement of the sleeve causes radial movement of the first independent slides; axial movement of the sleeve effects application of a radial force onto the first independent slides, so as to cause inward movement of the first independent slides within the sleeve;
the second independent slides each has a cylindrical surface and a tapered surface on an outer side surface thereof, wherein the cylindrical surface is configured to come into contact with a portion of the sleeve between the wedge blocks when the wedge blocks are in contact with tapered surfaces of the first independent slides; and the tapered surface of the second independent slide is configured to come into contact with the sleeve so that the sleeve applies a radial force onto the second independent slides, thereby causing inward movement of the second independent slides within the sleeve, after the sleeve moves further to cause the inward movement of the first independent slides; and
wherein a plurality of first grooves and a plurality of second grooves are arranged alternately at another end of the sleeve, and the slide seat is provided with a through hole, and wherein a plurality of large protrusions respectively engageable with the plurality of first grooves and a plurality of small protrusions respectively engageable with the plurality of second grooves, when the sleeve passes through the slide seat, are formed on an inner wall of the through hole.

15. A mold core for manufacturing a container closure, comprising a plurality of slides, a sleeve placed over the plurality of slides, a slide seat on which the plurality of slides are mounted, and a cam device arranged inside a space defined by the plurality of slides,
wherein the plurality of slides comprise a plurality of first independent slides and a plurality of second independent slides;
wherein the slide seat is provided with a plurality of large slide slots alternating with a plurality of small slide slots, all of the slide slots being arranged circumferentially;
wherein each of the first independent slides has a first mounting portion slidably mounted in one of the small slide slots, and each of the second independent slides has a second mounting portion slidably mounted in one of the large slide slots; and
wherein the first mounting portions are sized differently from each other, and the small slide slots are correspondingly sized differently from each other to mate with the respective first mounting portions; and the second mounting portions are sized differently from each other, and the large slide slots are correspondingly sized differently from each other to mate with the respective second mounting portions.

* * * * *